Aug. 26, 1930.     A. A. BULL     1,774,352
AIR CLEANER
Filed Sept. 14, 1923     2 Sheets-Sheet 1

Inventor
Arthur A. Bull.

By Stuart C. Barnes
Attorney

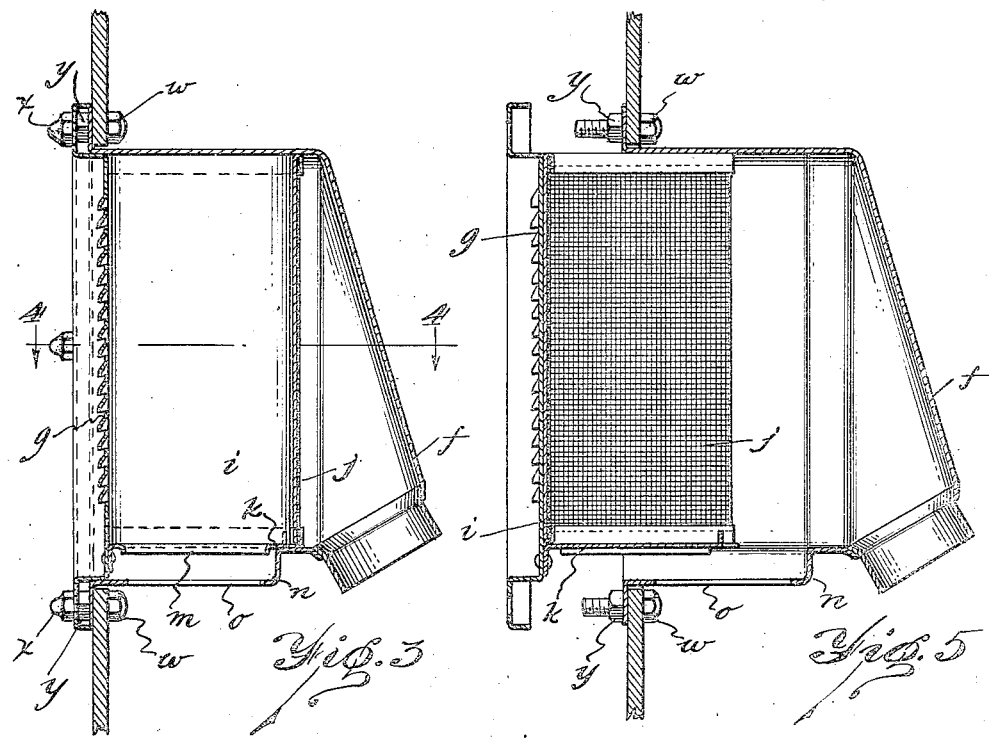
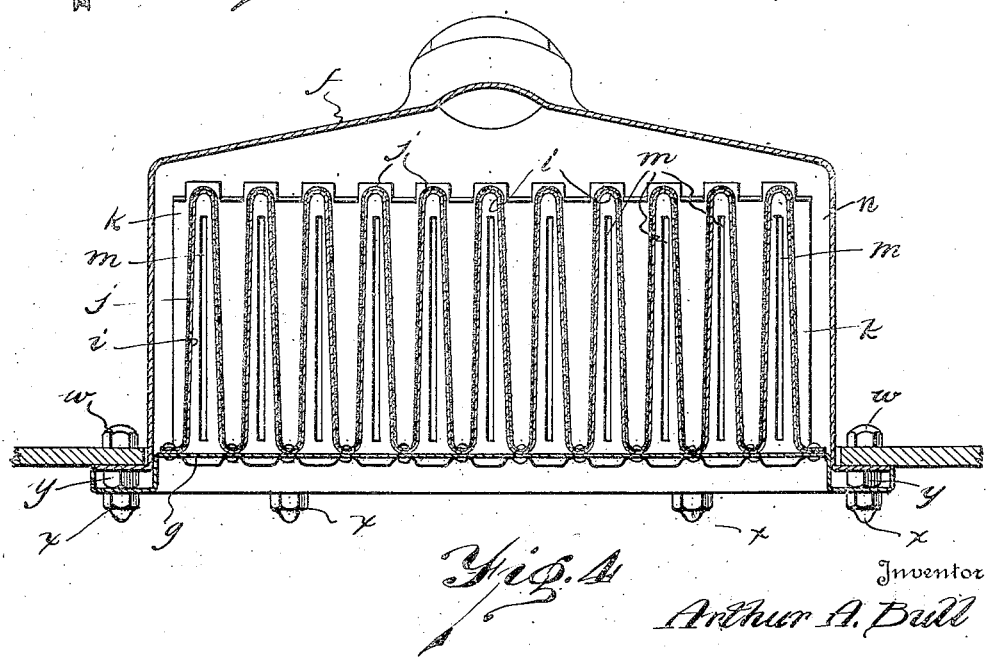

Patented Aug. 26, 1930

1,774,352

UNITED STATES PATENT OFFICE

ARTHUR A. BULL, OF DETROIT, MICHIGAN

AIR CLEANER

Application filed September 14, 1923. Serial No. 662,782.

This invention relates to automobiles and has for its object an arrangement of a carburetor and an air filter whereby the position of the air filter eliminates a large amount of dust that would otherwise be drawn into the filter. Furthermore, the air taken into the carburetor especially in a closed car, has a more uniform temperature both in winter and in summer than is the case with air drawn from under the hood.

The filter is so designed that the cross section of the intake of the carburetor has a relation to the area of the filtering material of at least 1 to 100. Consequently the air is drawn through the filtering material very slowly and by very weak suction. The dust on the filtering material therefore does not adhere to the filtering material very tenaciously and vibration of the car very easily shakes it off and drops it down into the bottom of the filter where it escapes.

Another feature of the filter is the arrangement of the filtering unit with the louver plate and the arrangement of these two elements with respect to the dash, so that the filtering unit may be removed through the dash of the car for cleaning. This makes it very easy for the driver at any time to clean the filter.

In the drawings:

Fig. 3 is a vertical cross section taken on the line 3—3 of Fig. 2.

Fig. 4 is a horizontal section of the filter.

Fig. 5 is a section showing how the filtering unit may be removed from the housing.

Figure 1:
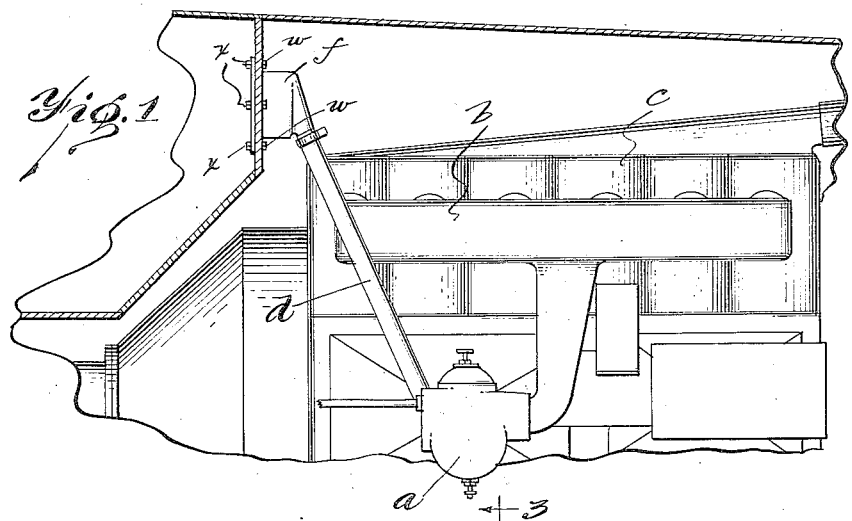
Fig. 1 is a fragmentary longitudinal section of the front of an automobile, showing the filter in place and connected up with the carburetor.
Figure 2:
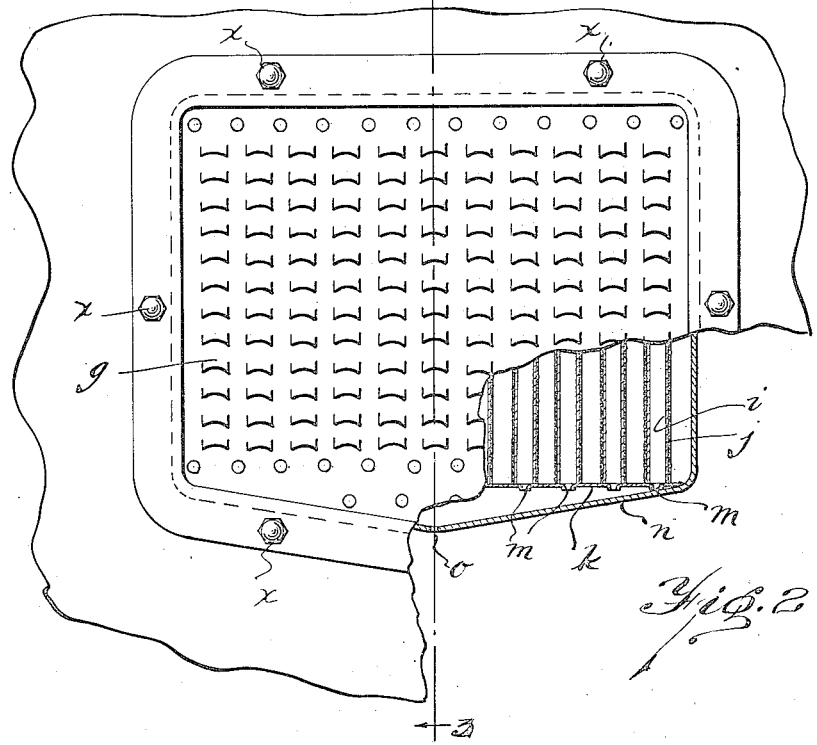
Fig. 2 is a front view of the filter with a part in section.

Air filters are quite commonly used in connection with tractors which stir up a large amount of dust and it is a recognized necessity with tractors to in some way prevent this dust passing into the cylinders. It is a well known fact that dust and grit passing into the cylinders causes the cylinder walls and the piston to wear and causes the compression efficiency of the engine to deteriorate. It is also an ascertained fact that a large amount of the deposit supposed to be carbon deposit on the heads of the cylinders and pistons is nothing more or less than large accumulations of dust and grit mixed with the carbon. These facts have been appreciated to a certain extent with tractors where the dust to air ratio is larger and where obviously some measure of protection must be adopted. However, very little effort has been made to develop suitable filters for automobiles and trucks.

Dust separation is effected often by a fan or centrifugal device which tends to throw out the dust from the air and separate it from the air before the same is drawn into the carburetor. The filters used with tractors have been largely of the oil or water type and are usually heavy, cumbersome things that are ill-adapted for use on passenger cars. It is to avoid these heavy cumbersome filters and yet provide an efficacious air straining device that I have designed the apparatus hereinafter described.

Referring to the drawings:

*a* designates the carburetor, *b* the manifold, *c* the engine block and *d* a pipe leading from the filter housing *f* to the carburetor.

This filter comprises a housing *f* which may be a suitably designed stamping, or of course, it could be a casting. Bolted to the face of this housing is a louver plate *g*, which in a small measure tends to strain the air by preventing the dust settling into the filter, it having to be drawn up through the bottom openings of the louvers. Within the housing and back of the louver plate are a large number of corrugations formed by bending the wire mesh or screen *j* in a sort of bellows-like arrangement. On the inside of these corrugations the filtering material, preferably felt and designated *i*, is sewed. By having this large number of corrugations of filtering material, obviously, a very large area of filtering surface is afforded. In fact, I prefer to have a ratio of filtering surface to intake cross section of the carburetor of approximately 100 to 1, so that the suction on any unit of the filtering material is relatively weak, and the air strikes the filter at a very low speed. Consequently, the dust is not driven into the filtering material at such a velocity as to either go through it or lodge on it so that it cannot be easily shaken loose.

These corrugations are supported on a plate *k*, which has openings *m* punched in the bottom, through which the suspended material is shaken off the filter, drops into the pan *n* below and slides down the inclined surface to the opening *o* of the center, through which it is discharged. This arrangement of having small holes in the plate *k* and a relatively long and narrow slot in the bottom of the pan *n*—approximately $\frac{3}{32}$ of an inch, prevents any large amount of air being drawn up into the filter from under the hood. The great bulk of air must be taken from the inside of the compartment where it is free from the dust ordinarily occurring in the air under the hood.

It will be noted that the plate *k* is riveted to the louver plate as are also the ends of the corrugated wire mesh. Hence, these corrugations of filtering material are a unit with the louver plate and can be removed with the louver plate from the housing. Bolts *w* are set in from the inside of the dash. The housing is bolted to the inside of the dash by the square nuts *y* and acorn nuts *x* on the ends of the bolts removably secure the louver plate to the inside of the dash. Hence, by simply removing the acorn nuts *x*, the driver may easily remove the filtering unit and shake or clean any dust off that has not been shaken off by the vibration of the car. This makes it very easy and convenient to clean the device.

So far as I am aware, the few filters that have been used in connection with passenger cars or trucks have taken the air from under the hood. There is a very heavy circulation of dust laden air under the hood due to the air being sucked through the radiator for cooling. This is usually accentuated due to the draft of the fan which draws the air through the radiator interstices and throws it back on the engine. In traveling along a dusty road, a large amount of dust is picked up this way especially where vehicles travel on the road near by. This will be evident to anybody that has inspected his engine after going over a dusty country road. This dust laden air is drawn directly into the mouth of the filter and some of it is either drawn through the filter or else so much of it is drawn into the filter as to tend to block the filter and make its operation unreliable.

By locating the filter directly on the dash and having it draw air from the driver's compartment, I accomplish two important improvements. I find that about 60% less dust and dirt is drawn into the filter at this place than under the hood.

I find further that air taken from the driver's compartment, especially in a closed car, has a very desirable temperature condition for use in the engine. In most automobiles today, some provision is made for heating the air taken into the carburetor in the winter and discontinuing the heat in the summer. This is ordinarily called the stove. It is recognized that the best temperature for air to be taken into the carburetor is air at substantially summer heat. Consequently, in the winter time the air is drawn off the exhaust pipe; in the summer time this is discontinued as it is found that the air is too hot to get the best results in the carburetor. Consequently, some kind of valve is ordinarily provided to discontinue the use of the stove in the summer. In a rough way, I approach these same advantages by placing the air intake in the driver's compartment. Air in a closed car in the driver's compartment even in the coldest winter time, is not a great deal below normal room temperature. In an open car, of course, it is considerably colder but at the same time the air under the cowl in front of the dash is much warmer than it is under the hood where the cold blast is drawn in by the fan. Hence, placing the air intake opening of the filter in the driver's compartment tends to take air of a temperature very much better calculated for the use of the carburetor both in the cold winter weather and in the summer weather.

If the air in the driver's compartment is not found sufficiently warm to constitute a fair substitute for the stove on the exhaust, sufficient heat may be secured by passing the pipe from the filter to the carburetor in proximity with the exhaust pipe, as for instance, coiling it around the same or some other similar arrangement.

What I claim is:

1. In an automotive vehicle, the combination of a body provided with a dash, a hood and an internal combustion engine provided with a carburetor located under the hood, a filter housing secured to the front of the dash and having connection with the carburetor, and a filtering unit removably secured in the housing and removable in its entirety through the rear of the dash.

2. In an automotive vehicle, the combination of a body provided with a dash and with a carburetor located under the hood, a filter housing secured to the front of the dash and having connection with the carburetor, and a louver plate provided with a filtering unit removable through the rear of the dash from the filter housing 3. In an automotive vehicle, the combination of a body provided with a dash, a hood and an internal combustion engine provided with a carburetor located under the hood, a filter housing bolted to the front of the dash and having a pipe connection with the carburetor, a louver plate provided with a filtering unit on its back comprising a plurality of vertical folds of filtering material and removably secured to the filter housing but removable therefrom through the rear of the dash.

In testimony whereof I affix my signature.

ARTHUR A. BULL.